Feb. 22, 1938. H. L. SELGER 2,109,344
GROUND JOINT PIPE COUPLING
Filed May 28, 1937
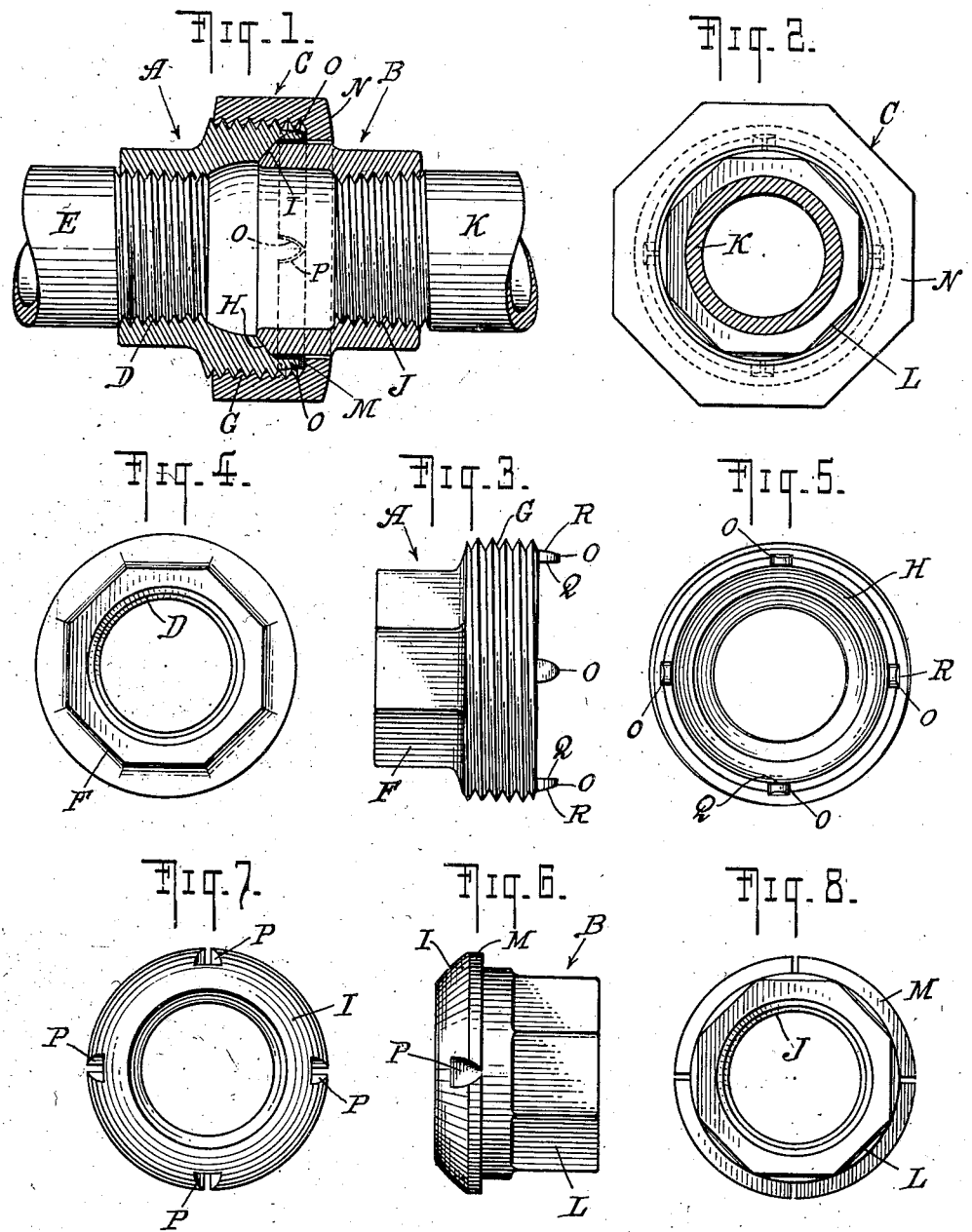
WITNESS
G. V. Rasmussen
INVENTOR
HENRY L. SELGER
BY
ATTORNEYS Patented Feb. 22, 1938

2,109,344

UNITED STATES PATENT OFFICE 2,109,344

GROUND JOINT PIPE COUPLING

Henry L. Selger, Newton, N. J.

Application May 28, 1937, Serial No. 145,180

3 Claims. (Cl. 285—120)

This invention relates to couplings of the kind adapted particularly for use in uniting pipe sections and the object of the invention is to provide a simply constructed, practical coupling of the indicated type which can be readily assembled in position between two pipe sections by the use of a single tool and which will form a perfect joint between the two connected pipes.

Pipe couplings of the type with which the invention is particularly concerned are known as unions and usually comprise two sections having pipe ends adapted to be screwed on the ends of the pipes to be connected, one of such sections being provided with an enlarged thread end having an interior ground conical seat and the other of such sections having a flanged end provided with a tapered seating surface adapted to make a joint with the conical seat on the first section. The two sections are usually joined together in coupled relation by a nut screw provided with an inwardly extending flange for engagement with the shoulder provided by the flanged end of said other section and an internal right-hand thread adapted to threadedly engage with the thread end of the first member. As the pipe ends of the two sections are usually provided with interior right-hand threads for engagement with the external threads cut in the ends of the pipes to be united, it is difficult to assemble this type of coupling on the pipes so as to secure a perfect tight joint between the seating surfaces of the sections or without loosening one of the sections on the pipe to which it is connected, unless the workman during such assembling operation uses in addition to the tool for screwing the parts together, a restraining tool to prevent the parts already securely assembled from becoming unloosened. According to this invention, there is provided on the coupling section having the thread end, a plurality of projecting elements which extend outwardly from the thread end of such section in substantially parallel relation with the longitudinal axis of such section and are adapted to engage in interlocking relation with depressions or slots provided in the flange of the other section, thereby assuring that the sections and nut screw can be securely and tightly assembled on the pipes to form a perfect joint between such pipes without the danger of any of the parts becoming loosened during such operation and without the need for using any tool other than the one necessary for assembling the union on the pipe ends.

I am aware that it has heretofore been proposed to lock pipe coupling sections against rotational movement during the assembly of the coupling by means of a tongue and recess such as shown, for example, in the Patent No. 600,988 to Hayes, issued March 22, 1898. One of the troublesome factors of this type of structure is that only one tongue and recess is provided which makes it necessary at times, in order to align these elements properly, to unloosen the sections screwed on the pipes to such an extent that leaky connections between the sections and the pipes are likely to develop. Furthermore, the tongue is formed on the section provided with the tapered annular tongue and is longer than such tongue so that such annular tongue or the annular seat does not assist in the interconnection of the tongue and recess but such construction in fact renders the connection of the parts quite difficult because the pipes to be connected are rarely in truly aligned position. Other disadvantages of this construction are that the locking tongue and recess are as wide as the thickness of the end walls of the sections, thereby reducing the effectiveness of the joint between the annular tongue and groove and the locking tongue must be provided with screw threads in order to facilitate the screwing of the union on the tapered threads provided on the abutting ends of the coupling sections. Because of these disadvantageous features the method of locking the coupling sections disclosed in this patent has, so far as I am aware, never been adopted for a union of the type with which this invention is particularly concerned, namely, one having a ground joint connection and provided on only one section with a non-tapering external thread for engagement by the non-tapering thread of the nut screw.

I have found that in order to retain the advantageous features of the ground joint pipe coupling and at the same time prevent rotational movement between the parts during their assembly so that the use of only a single tool is necessary, three or more projecting elements and receiving depressions may be provided, that the projections should preferably be provided on the section provided with the thread end so that the tapered ground face of the other section assists in the seating of such projections in the depressions and that the projections and depressions must be so constructed and arranged with relation to the other parts of the coupling that they will not interfere with the securing of a tight perfect joint between the ground surfaces. The present invention presents a structure which embodies all these necessary features and, in so far as I am aware, provides for the first time a thoroughly practical and reliable ground joint coupling which can be assembled by the use of a single tool yet possesses all the advantages common to this type of coupling.

The nature and utility of the invention will be better understood from the following description taken in connection with the accompanying drawing, which illustrates a preferred form of the invention and in which Fig. 1 is a vertical central section of my improved coupling showing the relation of the several parts in their assembled condition on the ends of two connected pipes; Fig. 2 is an end view of such assembly looking from the right of Fig. 1; Fig. 3 is a side elevation of one of the coupling members; Figs. 4 and 5 are, respectively, left-hand and right-hand end views of the member shown in Fig. 3; Fig. 6 is a side elevation of another of the coupling members and Figs. 7 and 8 are, respectively, left-hand and right-hand end views of the member shown in Fig. 6.

In the drawing, the reference characters A and B indicate generally the sections of my improved coupling which are attached to the abutting ends of the pipes to be connected while the letter C indicates generally the nut or ring screw for coupling the sections A and B together. The pipe end of Section A is provided with an interior tapered right-hand thread D adapted to threadedly engage with an exterior tapered thread cut in the end of a pipe E and has a polygonically-shaped outer surface F, as is shown more clearly in Fig. 3, so that such section may be securely engaged by a wrench or other suitable tool to screw it tightly into proper position on the end of the pipe E. Integral with the pipe end of section A is an enlarged annularly-shaped end having a non-tapering exterior thread G cut in its outer cylindrical surface and being provided at its forward end with an interior frustoconically shaped ground seating surface H within which the tapered forward end I of the section B is adapted to be seated.

The pipe end of section B is also provided with an interior tapered right-hand thread J for engagement with the exterior tapered thread cut in the end of the second pipe K which is to be coupled with the threaded end of the pipe section E and has a polygonically-formed exterior surface L, whereby such section may be tightly screwed into position on the pipe K by a wrench or other suitable tool. The other end of the section B is provided with an external annular flange or rim M, the forward face of which is tapered and forms part of the ground tapered seating surface I and the inner face of which forms an annular shoulder with which the inwardly extending flange N of the nut screw C engages when the non-tapered right-hand interior thread of such nut is in threaded engagement with the thread end of the section A.

The thread end of section A is provided with a plurality of projections O which extend forwardly beyond the end of such section in substantially parallel relation with the longitudinal axis of such section and are adapted to engage with a similar number, at least, of slots P provided in the annular flange M of the section B when the tapered seating surface I of section B is properly seated in the conical seat H of section A. The projections O are spaced around the forward edge of the thread end of section A in sufficient number, preferably four, to obtain a registration of the same with the slots P on a short turn of either of the sections. Each of the projections O is substantially triangular in shape and includes a relatively flat inner side Q disposed adjacently the outer edge of the conical seat H and an arcuately-shaped outer side R which curves or tapers inwardly from its base portion so that the projecting end of such projection is thinner in section than the end adjacent the section A, as is shown in Figs. 3 and 5, the base portion of such outer side preferably being disposed at least in and not projecting beyond the cylindrical surface in which lie the roots of the thread G. Because of this construction of the projections, they can be readily inserted into proper interlocking engagement with the slots P and will not interfere with the screwing of the nut screw C on the thread G. The slots P are disposed in the flange or rim M of the section B and are shaped to receive the triangularly-formed projections P readily when the sections are disposed so that such slots and projections are in alignment. As is shown more clearly in Fig. 1, the length of the projections O is such that when the seating surfaces H and I are in proper engagement, the projections O do not extend entirely through the slots to project beyond the shoulder or inner face of the flange against which the flange N of the nut screw C contacts in the assembled condition of the several parts, so that such projections do not interfere with the obtaining of a tight perfect joint between the sections A and B.

It will be seen in Fig. 1 that the projections O are shorter than the threads in the nut screw C, thus making it possible to draw the sections A and B together preliminary to the final locking against rotation when the projections O engage in the slots P.

With a coupling such as above described, two sections of pipe may be readily united together with the use of a single wrench. The polygonically-formed pipe ends of the sections A and B facilitate the screwing of such sections on the pipe ends and enable the wrench to screw each section on the pipe with which it is to be associated as tightly as the tapered threads of such section and the pipe will allow. The projections O can be readily registered with the slots P on a short turn of either of the sections A or B and will easily slide into interlocking engagement with such slots, the tapered ground surface I cooperating to assist the projections to engage the slots as the two sections A and B are drawn together to make a proper joint. The interlocked projections and slots will permit of no relative movement between the sections A and B during the assembling operation and consequently there is no necessity for the workman to use a restraining tool to prevent either of such sections from becoming loosened on the pipes or from forming a perfect joint. The projections and slots are so constructed and arranged with relation to each other and the other parts of the coupling that they do not interfere with the screwing on of the flanged nut C as tightly as possible or with the obtaining of a tight non-leakable connection between the two pipes.

It is apparent that the coupling described is thoroughly practical for the purposes for which it was intended and that numerous modifications may be made without departing from the scope of the invention as covered by the appended claims whose purpose it is to include and embrace any such modifications or equivalents. Thus, it is possible to make the projections O thicker than the described embodiment so that the outer sides thereon project beyond the cylindrical surface in which the roots of the threads G lie and in this case the tapered sides of the projections are provided with short sections of threads which cooperate with the thread G to enable the nut screw C to threadedly engage the thread G. The seating surface or seat H may comprise a brass ring which has been forced into an interior groove provided in the enlarged annularly-shaped or thread end of the section A under pressure and then ground to insure a tight joint, so that a non-corrosive brass-to-iron connection is made between such seat and the tapered end I of the section B, thereby providing a perfect joint which can be readily broken for separating the connected pipe sections.

I claim:

1. In a pipe coupling comprising male and female members having mating conical faces, one of said members having an annular shoulder thereon, the other of said members having threads thereon, and a coupling nut having a flanged portion and a threaded portion to engage said annular shoulder and threads, respectively, for drawing and holding said members together, means comprising axially projecting lugs on the female member, and cooperating recesses in the male member, the lugs on said female member being disposed radially outward of the conical face of said male member, said cooperating recesses being in the conical face of said male member, and said lugs being shorter than the threaded portion of said coupling nut.

2. In a pipe coupling comprising male and female members having mating conical faces, one of said members having an annular shoulder thereon, the other of said members having threads thereon, and a coupling nut having a flange portion for engaging said shoulder and a threaded portion for engaging the threads on the other of said members for drawing and holding said members together, means comprising axially projecting lugs on one of said members, and cooperating recesses in the other of said members, said lugs being shorter than at least one of said threaded portions, whereby to prevent the relative rotation of said members by the engagement of said lugs in said recesses when said joint is assembled.

3. In a pipe coupling comprising male and female members having mating conical faces, said male member having an annular shoulder thereon said female member having threads thereon, and a coupling nut having a flange portion for engaging said shoulder and a threaded portion for engaging said threads on said female member for drawing and holding said members together, means comprising axially projecting lugs on said female member and cooperating recesses in the male member, said lugs being shorter than at least one of said threaded portions, whereby to prevent the relative rotation between said members by the engagement of said lugs in said recesses when said joint is assembled.

HENRY L. SELGER.